United States Patent
Kim et al.

(10) Patent No.: US 10,380,101 B2
(45) Date of Patent: Aug. 13, 2019

(54) APPARATUS AND METHOD FOR MANAGING OF DATABASE IN ENERGY MANAGEMENT SYSTEM

(71) Applicant: LSIS CO., LTD., Gyeonggi-do (KR)

(72) Inventors: Sung-Ho Kim, Gyeonggi-do (KR); Jong-Ho Park, Gyeonggi-do (KR); Yong-Ik Lee, Gyeonggi-do (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 356 days.

(21) Appl. No.: 15/221,501

(22) Filed: Jul. 27, 2016

(65) Prior Publication Data

US 2017/0031971 A1    Feb. 2, 2017

(30) Foreign Application Priority Data

Jul. 29, 2015   (KR) .................. 10-2015-0107563

(51) Int. Cl.
| | |
|---|---|
| G06F 7/00 | (2006.01) |
| G06F 17/00 | (2019.01) |
| G06F 16/23 | (2019.01) |
| G06F 16/21 | (2019.01) |
| G06F 16/22 | (2019.01) |
| G06F 16/245 | (2019.01) |
| G06Q 10/06 | (2012.01) |
| G06Q 50/06 | (2012.01) |

(52) U.S. Cl.
CPC .......... *G06F 16/2365* (2019.01); *G06F 16/21* (2019.01); *G06F 16/22* (2019.01); *G06F 16/245* (2019.01); *G06Q 10/06* (2013.01); *G06Q 50/06* (2013.01)

(58) Field of Classification Search
CPC ...... G06F 16/2365; G06F 16/21; G06F 16/22; G06F 16/245; G06Q 10/06; G06Q 50/06
See application file for complete search history.

(56) References Cited

U.S. PATENT DOCUMENTS

| | | | |
|---|---|---|---|
| 6,789,115 B1* | 9/2004 | Singer ................. | G06F 11/3495 707/999.102 |
| 2003/0058355 A1* | 3/2003 | Wong ................... | G11C 27/005 348/231.99 |

(Continued)

FOREIGN PATENT DOCUMENTS

| | | |
|---|---|---|
| CN | 102184209 A | 9/2011 |
| CN | 104330620 A | 2/2015 |

(Continued)

OTHER PUBLICATIONS

European Search Report dated Nov. 3, 2016 corresponding to European application No. 16177201.7-1955.

(Continued)

*Primary Examiner* — Azam M Cheema
(74) *Attorney, Agent, or Firm* — K&L Gates LLP

(57) ABSTRACT

Disclosed embodiments relate to data management apparatus of an energy management system and methods for managing data of an energy management system. In some embodiments, a data management apparatus includes: a data type determination part configured to determine a type of data collected from a power system; a data analysis part configured to analysis data determined as analog data by the data type determination part; and a first data processing part configured to process the analog data based on a result of the analysis by the data analysis part.

3 Claims, 4 Drawing Sheets

(56) References Cited

U.S. PATENT DOCUMENTS

| | | | |
|---|---|---|---|
| 2007/0250217 A1* | 10/2007 | Yoon | H02J 3/1814 |
| | | | 700/286 |
| 2009/0187297 A1* | 7/2009 | Kish | G05B 23/0213 |
| | | | 701/21 |
| 2011/0116441 A1* | 5/2011 | Wyler | H04B 7/18584 |
| | | | 370/316 |
| 2013/0069796 A1 | 3/2013 | Ludwig | |
| 2014/0129746 A1 | 5/2014 | Zhou et al. | |
| 2015/0074061 A1 | 3/2015 | Yoon | |

FOREIGN PATENT DOCUMENTS

| | | |
|---|---|---|
| CN | 104769582 A | 7/2015 |
| JP | 2000-341882 A | 12/2000 |
| JP | 2007-306717 A | 11/2007 |
| JP | 4660058 B2 | 3/2011 |
| JP | 5065658 B2 | 11/2012 |
| KR | 10-2002-0090372 A | 12/2002 |
| KR | 10-0426691 B1 | 4/2004 |
| KR | 101211118 B1 | 12/2012 |
| KR | 10-1341805 B1 | 1/2014 |
| KR | 10-2015-0002914 A | 1/2015 |
| KR | 10-1478549 B1 | 1/2015 |
| KR | 10-2015-0049186 A | 5/2015 |

OTHER PUBLICATIONS

Korean Office Action dated Jun. 14, 2016 corresponding to Korean application No. 9-5-2015-043027177.
Chinese Office Action for related Chinese Application No. 201610594726.1; action dated Jan. 11, 2019; (6 pages).

\* cited by examiner

APPARATUS AND METHOD FOR MANAGING OF DATABASE IN ENERGY MANAGEMENT SYSTEM

CROSS REFERENCE TO RELATED APPLICATIONS

This application claims the benefit of Korean Patent Application No. 10-2015-0107563, filed on Jul. 29, 2015, entitled "APPARATUS AND METHOD FOR MANAGING OF DATABASE IN ENERGY MANAGEMENT SYSTEM", which is hereby incorporated by reference in its entirety.

BACKGROUND

Technical Field

The present disclosure relates to an energy management system and more particularly, to an apparatus and method for managing a database in an energy management system.

Description of the Related Art

Under circumstances of increased government regulation for improvement of energy efficiency and reduction of greenhouse gas, increased burden on energy costs, insufficient supply of power, and so on, there is a rising interest in reducing energy consumption and improving energy efficiency. Although the reduction of energy consumption requires measures which are systematic, sustainable and effective, satisfactory means have not been suggested until now. Therefore, for the purpose of reduction of energy consumption, there is a need of powerful means for determining where and how much energy is consumed, discovering factors of energy dissipation, and finding and fulfilling improvement plans.

As such means, an energy management system (EMS) capable of monitoring and controlling a flow of energy is receiving a global spotlight. The energy management system is an integrated energy management solution capable of optimizing energy consumption by monitoring situations of energy consumption in real time and analyzing an aggregation of data based on hardware, software and ICT-based monitoring and control techniques.

In the conventional energy management system, data acquired from a power system are simply divided into digital data and analog data to be processed, as will be described in detail below with reference to FIG. 1.

FIG. 1 is a block diagram used to explain a conventional database managing method.

Referring to FIG. 1, a control part 12 of an energy management server (not shown) may include a database type determination part 121, a digital data processing part 122 and an analog data processing part 123.

The database type determination part 121 determines a type of data acquired from a power system 20. Specifically, the database type determination part 121 determines a type of data delivered from a regional control center (not shown) through a data linker (not shown). The data type may be at least one of digital and analog. The database type determination part 121 receives measurement data in an appointed format from the local power feeding site through the data linker. Then, the data type determination part 121 can analyze the data to determine the data type. Information used for the determination on the data type may be defined in a transport protocol.

At this time, the digital data may be data obtained by representing the status of a power production or management apparatus as a value "0" or "1." In addition, the digital data may be data obtained by representing ON/OFF of a switch as a value "0" or "1."

The analog data may be numerical data related to power generation. For example, the analog data may be data related to generated power quantity or wattage.

The digital data processing part 122 included in the control part 12 processes the digital data acquired from a power system (not shown) and stores the processed digital data in a database 11. The analog data processing part 123 included in the control part 12 processes the analog data acquired from the power system and stores the processed analog data in the database 11.

However, in the conventional energy management system, the control part 12 includes only one digital data processing part and one analog data processing part. In this case, although the digital data can be processed with no problem, the analog data may be problematic in that there may occur a situation where the amount of received data exceeds an acceptable throughput since the amount of analog data is mostly enormous. Further, while such a situation is lasting, the analog data processing part 123 may become overwhelmed with data, which may result in discarding of the data without being processed. As a result, a database management apparatus may often create a database constructed by incorrect data.

SUMMARY

It is an aspect of some embodiments of the present disclosure to provide a database management apparatus and a method for operating the apparatus, which are capable of managing a database of an energy management system with high efficiency.

It is another aspect of some embodiments of the present disclosure to provide a database management apparatus and a method for operating the apparatus, which are capable of improving the integrity of data by classifying collected data according to its form and generation position.

In accordance with one aspect of some embodiments of the present disclosure, there is provided a data management apparatus of an energy management system, including: a data type determination part configured to determine a type of data collected from a power system; a data analysis part configured to analyze data determined as analog data by the data type determination part; and a first data processing part configured to process the analog data based on a result of the analysis by the data analysis part.

In some embodiments, the first data processing part may include a plurality of analog data processors.

In some embodiments, each of the plurality of analog data processors may be assigned for each regional control center, and, based on the result of the analysis, the data analysis part may determine which of regional control centers is received data measured at and deliver the received data to an analog data processor corresponding to the determined regional control center.

In some embodiments, the plurality of analog data processors may include different performances, and, the data analysis part may analyze the size of the received data and deliver the received data to an analog data processor including a performance corresponding to the analyzed data size.

In some embodiments, if the received data are not in a data format to create a database, the data analysis part may discard the received data.

In some embodiments, the data management apparatus may further include a second data processing part configured to process data determined as digital data by the data type determination part.

According to some embodiments of the present disclosure, it is possible to provide a database management apparatus and a method for operating the apparatus, which are capable of managing a database of an energy management system with high efficiency.

According to some embodiments of the present disclosure, it is possible to provide a database management apparatus and a method for operating the apparatus, which are capable of improving the integrity of data by classifying collected data according to its form and generation position.

DETAILED DESCRIPTION

Figure 1:
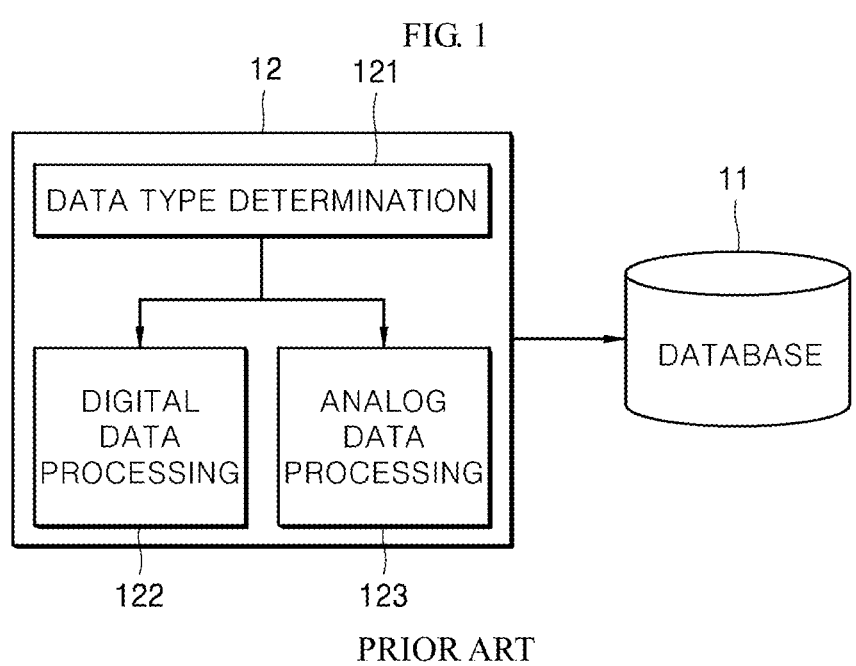
FIG. 1 is a block diagram used to explain a conventional database managing method, according to the prior art.

Hereinafter, embodiments of the present disclosure will be described in detail with reference to the accompanying drawings. It should be understood that the present disclosure is not limited to the following embodiments, and that some embodiments are provided for illustrative purposes only. The scope of the disclosure should be defined only by the accompanying claims and equivalents thereof.

In the following description, the terms "module" and "part," which are suffixes for elements, are given or used alone or in combination for the purpose of facilitating the description, but these terms are not intended to make a distinction between both.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow chart. These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products containing instruction means for performing the functions described in the blocks in the drawings or in the steps in the flow chart. The computer program instructions can also be installed in the computers or other processors of programmable data processing equipment. Therefore, a sequence of operation steps can be performed on the computers or other processors of programmable data processing equipment to produce computer-executable processes. In addition, the instructions operating the computers or other processors of programmable data processing equipment can provide steps for executing the functions described in the blocks in the drawings or in the steps in the flow chart. In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two successive blocks or steps may be performed substantially at once or may be sometimes performed in a reverse order depending on a corresponding function.

Figure 2:
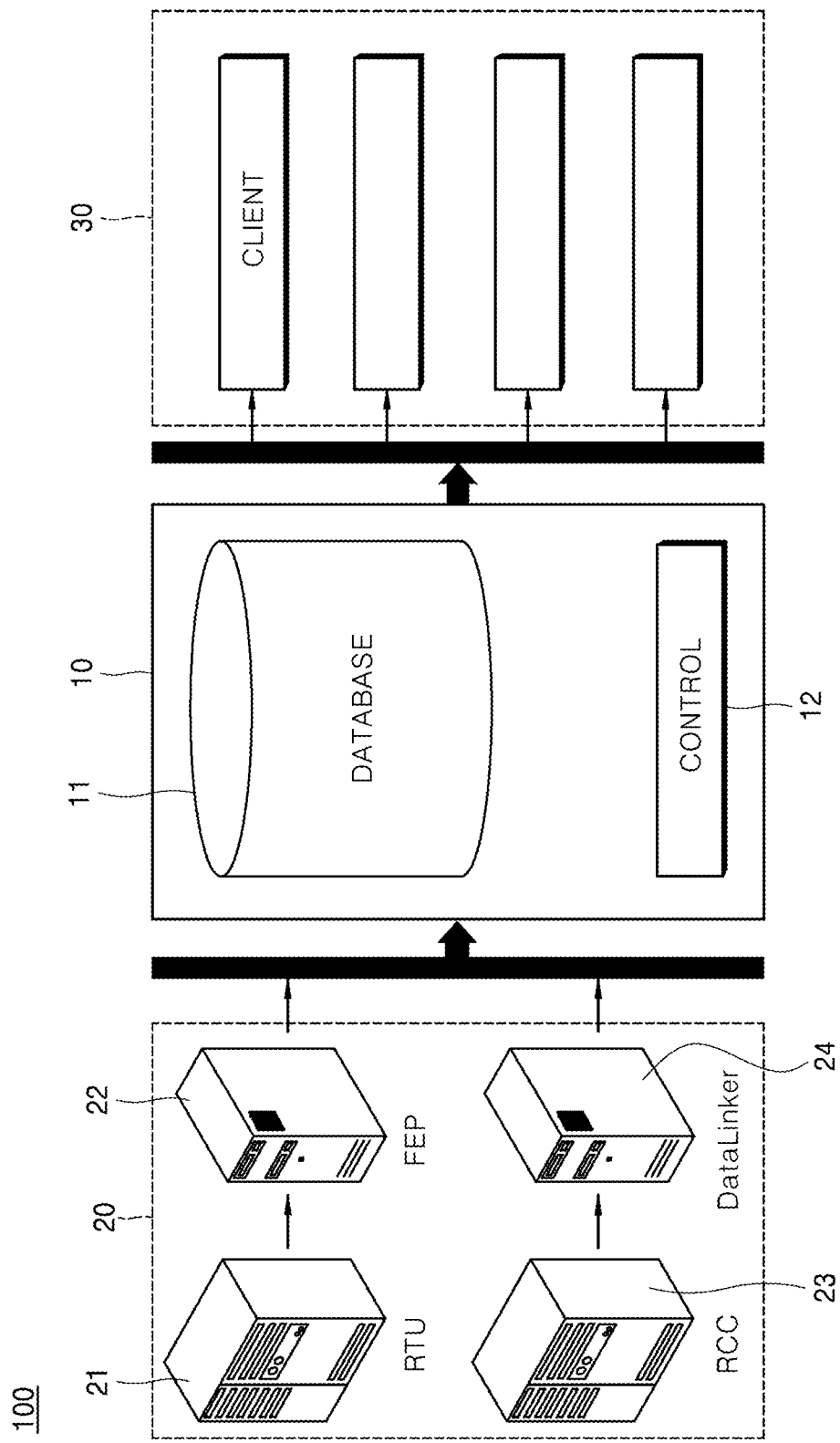
FIG. 2 is a schematic view illustrating the configuration of an energy management system according to some embodiments of the present disclosure.

FIG. 2 is a schematic view illustrating the configuration of an energy management system according to some embodiments of the present disclosure.

Referring to FIG. 2, an energy management system 100 according to some embodiments of the present disclosure may include an energy management server 10, a client 30 and a power system 20.

The energy management server 10 can receive data from the power system 20 and create the data in the form of a database 11. In addition, the energy management server 10 can provide the database 11 to the client 30. In addition, the energy management server 10 can manage and control the power system 20. The energy management server 10 may be connected to a plurality of clients 30. In addition, the energy management server 10 may include a dual structure.

The energy management server 10 may include the database 11 and a control part 12.

The database 11 can collect/store measurement data received from the power system 20 and store operational data based on the measurement data for each predetermined period. In addition, the database 11 can automatically create and store a list of measurement and operational data and store a list of policy data.

The control part 12 can control the overall operation of the energy management server 10. In some embodiments, the control part 12 can create the database 11 by processing data delivered from the power system 20. In other embodiments, the control part 12 can provide specified data to the client 30 at a request from the client 30.

As illustrated in FIG. 2, the energy management server 10 acquires data from a regional control center (RCC) 23 and a remote terminal unit (RTU) 21. The acquired data may be data, such as power, current, voltage, and a station capacity, used to monitor the operation of the energy management system 100.

Facilities responsible for the operation of the power system 20 may include a national control center (NCC), a regional control center (RCC) and a section control center (SCC). In some embodiments, the RCC 23 sectionalizes a system operational region into specified areas for different voltages and performs power feeding tasks in concerned areas. At present, the RCC 23 is installed and in operation for each of 9 power control centers of KEPCO (Korea Electric Power Corporation).

The energy management server 10 collects/stores spot information measured by the RTU 21 in real time and acquires data through a communication path such as a front-end processor (FEP) 22. In addition, the energy management server 10 uses an ICCP (Inter-control Center Communications Protocol) to acquire data of the RCC 23 via a data linker 24. The ICCP refers to a data transport protocol between the energy management server 10 and the RCC 23.

Hereinafter, some embodiments of the present disclosure capable of solving the above-described problems will be described with reference to FIGS. 3 and 4.

Figure 3:
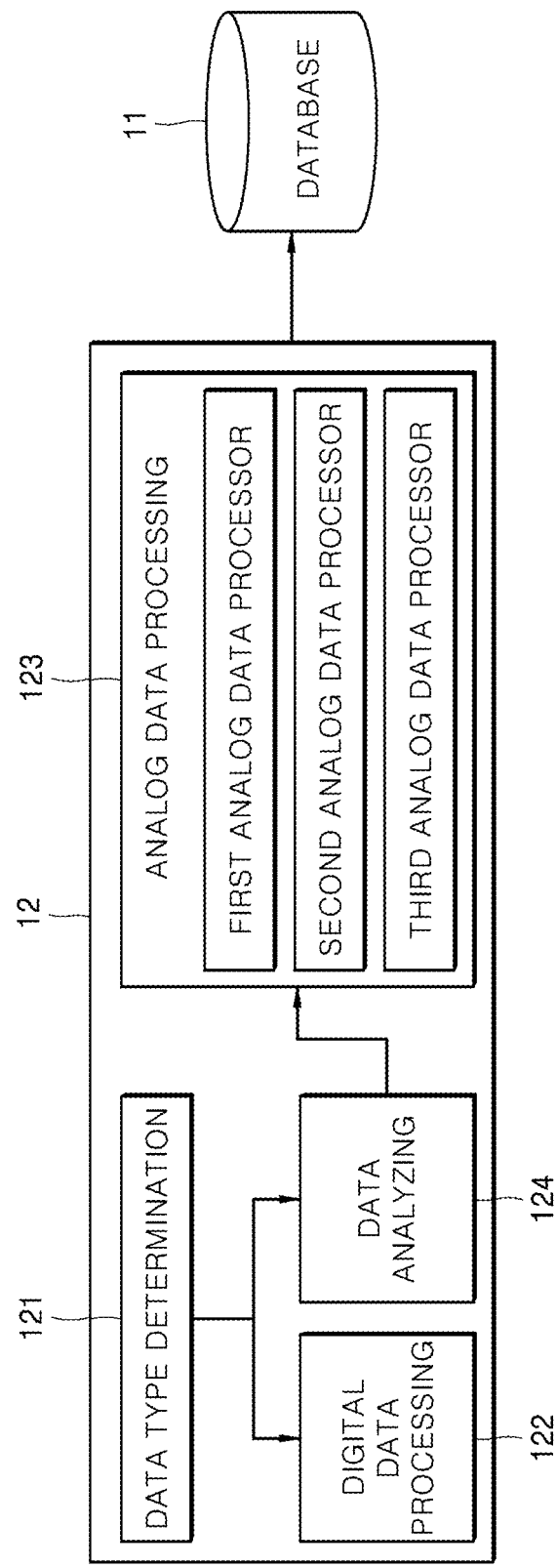
FIG. 3 is a block diagram illustrating the configuration of a control part of the energy management server according to some embodiments of the present disclosure.

FIG. 3 is a block diagram illustrating the configuration of the control part 12 of the energy management server 10 according to some embodiments of the present disclosure. In FIG. 3, the same elements as FIG. 1 are denoted by the same reference numerals and, therefore, explanation of which will not be repeated for the purpose of brevity.

The control part 12 according to some embodiments of the present disclosure further includes a data analysis part 124 and an analog data processing part 123 including a plurality of analog data processors.

When the data type determination part 121 determines that the corresponding data are analog data, the data analysis part 124 receives and analyzes the analog data. Specifically, the data analysis part 124 determines whether or not the received data complies with the ICCP. In addition, the data analysis part 124 analyses which of RCCs 13 are the received data measured at.

In some embodiments, the data analysis part 124 may determine whether or not the format of the received data complies with the ICCP. Data managed by a data management apparatus may include a variety of formats. However, the data format in which the data management apparatus can generate the database 11 complies with the ICCP. Different transport protocols include different data formats. The data analysis part 124 can determine whether or not the format of the received data is configured according to the ICCP. If the received data format does not comply with the ICCP, the data analysis part 124 may delete the data.

The analog data processing part 123 according to some embodiments of the present disclosure may include a plurality of analog data processors. Specifically, each analog data processor may be designated for each RCC which acquired data. For example, a first analog data processor can process data acquired by an RCC (A) and a second analog data processor can process data acquired by an RCC (B). In some embodiments, the analog data processing part 123 may include analog data processors as many as RCCs.

Figure 4:
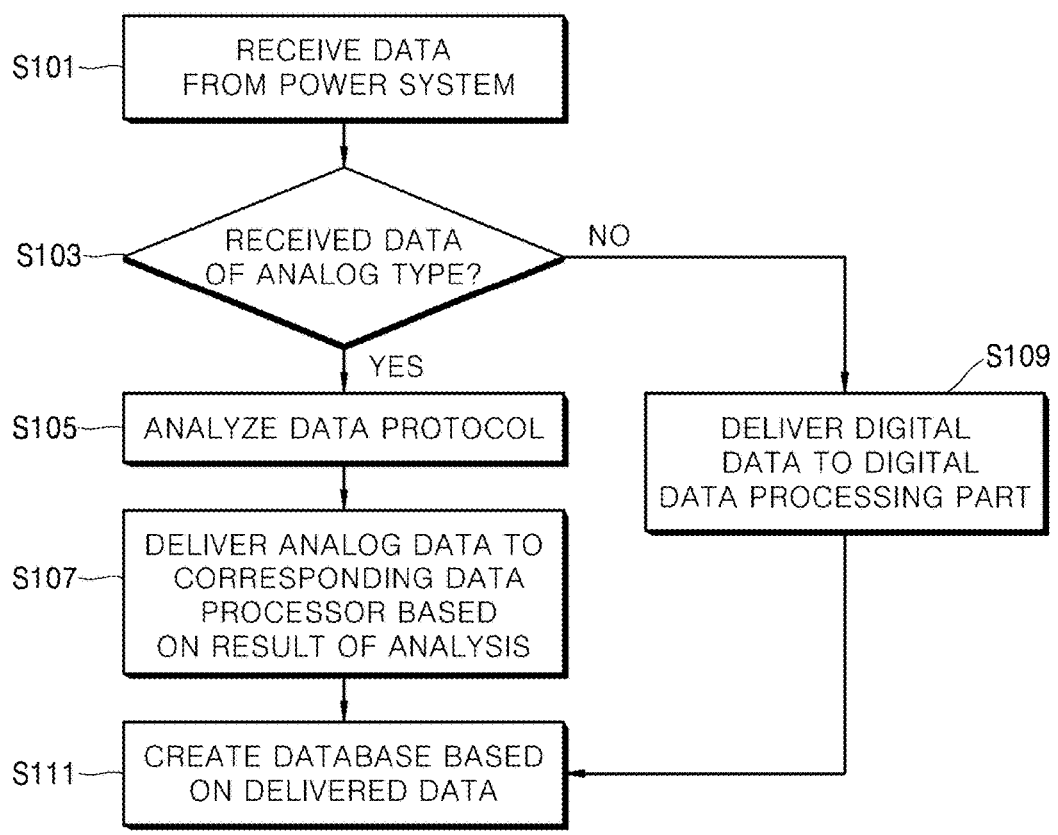
FIG. 4 is a flow chart illustrating an operating process performed by a database management apparatus according to some embodiments of the present disclosure.

FIG. 4 is a flow chart illustrating an operating process performed by a database management apparatus according to some embodiments of the present disclosure.

The energy management server 10 receives data from the power system 20 (S101). Specifically, the control part 12 of the energy management server 10 receives data measured by an RCC. At this time, the received data may be data complying with a determined format, which are acquired through the data linker 24. The determined format may be ICCP.

The data type determination part 121 in the control part 12 determines whether or not the received data are of an analog type (S103). Specifically, the data received by the control part 12 may be either analog data or digital data. Since the data may include different types depending on a process and a subject, there is a need to determine a data type. The data received by the control part 12 may include information indicating the type of data. Therefore, the data type determination part 121 can determine the type of data by extracting only the information with no need to analyze the entire data.

If the data are of an analog type, the data analysis part 124 receives the analog data and analyzes a data protocol (S105).

In some embodiments, the data analysis part 124 can determine whether or not the received data are data complying with an ICCP format. However, data used to generate and manage the database 11 may need to comply with the ICCP format. Therefore, the data analysis part 124 analyzes whether or not the received data complies with the ICCP format. If the received data do not comply with the ICCP format, the data analysis part 124 may discard the data without delivering the data to the analog data processing part 123.

In some embodiments, the data analysis part 124 can analyze which of RCCs 23 are the received data measured at. Specifically, when data measured at the RCC 23 are transformed into a determined format through the data linker 24, the data linker 24 can insert information of the RCC 23 in the data. Therefore, the data analysis part 124 can extract the information of the RCC 23 from the received data and analyze which of RCCs 23 are the received data measured at.

The data analysis part 124 delivers the analog data to a corresponding analog data processor based on a result of the analysis (S107). Specifically, if it is analyzed that the data received in the data analysis part 124 are data measured at an RCC (A), the data analysis part 124 delivers the data to the first analog data processor which processes only the data measured at the RCC (A). In this case, even when a great deal of analog data is received, the analog data can be distributed to and processed in a plurality of analog data processors set for different RCCs. As a result, it is possible to minimize the amount of wasteful data and hence improve the integrity of the database 11.

In some embodiments of the present disclosure, the data received by the data analysis part 124 can be delivered to an analog data processor set for each RCC.

In some embodiments, the data analysis part 124 can determine the size of data and deliver the data to an analog data processor including high performance. For example, if the first analog data processor includes the highest performance, the data analysis part 124 can always deliver data of more than a predetermined size to the first analog data processor irrespective of RCCs. This can eliminate a need to construct all the analog data processors with the same specification, which can result in reduction of costs required for system construction.

In other embodiment, the data analysis part 124 can receive a data processing load factor of an analog data processor and deliver data to an analog data processor including a low data processing load factor.

For example, if the first analog data processor includes a high data processing load factor due to processing on a great deal of data although it includes the highest performance, the data analysis part 124 can perform delivery of data to the first analog data processor in the next order.

If it is determined that data received in the data type determination part 121 is digital data rather than analog data, the data type determination part 121 delivers the data to the digital data processing part 122 (S109).

Then, the digital data processing part 122 creates the database 11 based on the delivered data (S111). In some embodiments, analog data can be processed by the analog data processing part 123 to create the database 11. In some embodiments, digital data can be processed by the digital data processing part 122 to create the database 11.

The created database 11 may be stored in a memory of the energy management server 10. The database 11 stored in the memory may be referred to as a real-time data base (RTDB).

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of some embodiments described herein may be made without departing from the spirit of the disclosures. The accompanying claims and their equivalents are intended to cover such forms or modifications as would fall within the scope and spirit of the disclosures. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data management apparatus of an energy management system, comprising:
    a data type determination unit configured to receive data from a power system and to determine a type of the received data;
    a data analysis unit configured to analyze the received data determined as analog data type by the data type determination unit, detect any one of a plurality of regional control centers where the data is measured, and analyze a size of the data; and
    a first data processing unit configured to process the analog data based on a result of the analysis by the data analysis unit,
    wherein the first data processing unit includes a plurality of analog data processors having different performance capabilities,
    wherein each of the plurality of analog data processors is assigned for each regional control center and each data size range, and
    wherein the data analysis unit delivers the analog data to any one of the plurality of analog data processors which corresponds to the detected regional control center and the analyzed data size,
    wherein, if the received data are not in a data format to create a database, the data analysis unit is further configured to discard the received data.

2. The data management apparatus according to claim 1, further comprising a second data processing unit configured to process data determined as digital data type by the data type determination unit.

3. The data management apparatus according to claim 1, wherein the first data processing unit is further configured to store the processed analog data in a database.

* * * * *